United States Patent Office 2,874,025
Patented Feb. 17, 1959

2,874,025

OXIDATION OF TRANSURANIC ELEMENTS

Robert Lee Moore, Richland, Wash., assignor to the United States of America as represented by the United States Atomic Energy Commission No Drawing. Application July 27, 1953
Serial No. 376,768

5 Claims. (Cl. 23—14.5)

The present invention relates to a method for the selective oxidation of metal values and particularly values of transuranic elements having a hexavalent state, such as plutonium and neptunium. More particularly, the present invention is concerned with the separation of said transuranic metal values from contaminants by selective oxidation and reduction and solvent extraction methods.

The first transuranic element, $Np^{239}$, was prepared by the neutron irradiation of uranium in 1939 by Macmillan and identified the following year by Macmillan and Abelson. Since that time numerous other isotopes of transuranic elements have been prepared and identified by various investigators, so that by the present time a total of six transuranic elements have been discovered. Of the six transuranic elements, however, only neptunium and plutonium are polyvalent under ordinary conditions and only neptunium and plutonium have the higher valence states +4, +5 and +6 in addition to the characteristic valence state of the actinide rare earths, +3. The term "polyvalent transuranic elements" will therefore be used throughout this specification and claims to refer to neptunium and plutonium.

Numerous isotopes of plutonium and neptunium have been found, ranging in mass number from 231 to 239 for neptunium and from 232 to 241 for plutonium. These isotopes, all of which are artificially produced, are usually produced in a similar manner, namely, the irradiation of various uranium isotopes and isotopic mixtures with nuclear and subnuclear particles such as neutrons, deuterons, protons, etc. The irradiation may be carried out in a particle accelerator such as the cyclotron or linear accelerator, or on a large scale it may be carried out in a neutronic reactor. Perhaps the most important of the neptunium and plutonium isotopes are $Np^{237}$, $Np^{238}$, $Np^{239}$ and $Pu^{239}$. $Np^{236}$ is formed by numerous reactions, for example, $U^{238}$, d–4n, $Np^{236}$. The long-lived neptunium isotope, $Np^{237}$, is formed by the beta decay of $U^{237}$, which in turn may be formed by an n,2n reaction with $U^{238}$ or a d,t reaction with the $U^{238}$. $Np^{239}$ is usually formed by the beta decay of $U^{239}$ which is formed by the n,γ reaction with $U^{238}$. It may, however, be formed by the d,n reaction with $U^{238}$ or an α,p2n reaction with $U^{238}$. $Pu^{239}$ is usually formed by the beta decay of $Np^{239}$.

It will be noted that most of these isotopes are formed by a nuclear reaction with uranium and that the resultant product in most cases will consist of a predominant quantity of uranium and small quantities of the transuranic element. In addition, the uranium may be contaminated with radioactive fission products if a fissionable isotope is present, such as $U^{235}$ or $Pu^{239}$, during the coarse of the reaction. The utility of $Pu^{239}$ in nuclear power and nuclear weapons is well known and the desirability of a method of recovery of this isotope from the irradiated mass is apparent. It is, however, also desirable to obtain the other isotopes of neptunium and plutonium in a purified state from an irradiated mass of uranium, since these purified isotopes, for example $Np^{237}$, have important uses in tracer research and other types of medical, chemical and industrial research.

One particularly useful method of recovering the transuranic hexavalent elements from uranium and/or fission products depends upon a series of oxidation-reduction reactions plus solvent extraction reactions. It is therefore usually referred to as the "Redox" method. Briefly, the process comprises the steps of dissolution of the uranium-containing transuranic hexavalent element in a mineral acid such as nitric acid. The resulting solution is then treated with an oxidizing agent to insure that the uranium is in the uranyl nitrate form and the transuranic element is in the oxygenated hexavalent nitrate form. The solution is then contacted with an organic solvent in the presence of a salting agent, preferably in a column-type reactor, under conditions such that the uranyl ions and hexavalent transuranic element ions are extracted into the organic solvent phase. A suitable solvent is an organic solvent, normally liquid and substantially immiscible with water. The solvent should contain at least one atom, such as an oxygen, sulfur or nitrogen atom, which is capable of donating an electron pair to a coordination bond. Numerous solvents may be used, such as ethyl ether, 1,2-dibutoxyethane, hexanol, methylisobutylcarbinol, etc. The preferred solvent, however, is methylisobutylketone, usually referred to as "hexone." Numerous salts may be used as salting agents; however, the preferred ones are ammonium nitrate and aluminum nitrate. If fission products are present in the original feed solution, most of these will remain in the aqueous phase. There are, however, at least two important fission products, namely, ruthenium and cerium, which tend to be extracted into the organic phase with the uranium and transuranic element.

The organic solvent containing the uranium and transuranic element is then introduced into a second column, usually referred to as the 1B column, where the transuranic element is selectively reduced to a lower valence state, preferably the +3, in which state the transuranic elements are not hexone-soluble, leaving the uranium in the extractable +6 form. A suitable selective reducing agent is ferrous ion. A "holding" reductant is also incorporated into this column, usually consisting of hydrazine. This holding reductant is added to make sure that the iron is present as the ferrous ion, since the ferrous ion is readily oxidized to the ferric form by air, $HNO_3$, etc. and, if insufficient ferrous ion is present, reduction of the transuranic elements to the lower valent forms may be incomplete and there will be less complete extraction. An aqueous extractant solution is also incorporated in the column. This usually consists of a dilute nitric acid solution containing a salting agent such as aluminum nitrate, which tends to prevent extraction of the uranium into the aqueous phase. The nitric acid always contains a certain amount of $HNO_2$, nitrous acid, and this seems to be the agent responsible for the deleterious oxidation of ferrous ions for the most part. Hydrazine reacts with $HNO_2$ according to the formula

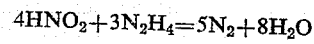

$$4HNO_2 + 3N_2H_4 = 5N_2 + 8H_2O$$

and the nitrogen gas escapes from the system. There are several other possible holding reductants—almost anything that will react with $HNO_2$ seems to work—for example, hydroxyl amine ($NH_2OH$) and sulfamic acid ($NH_2 \cdot SO_2 \cdot OH$). Sulfamic acid is a preferred reagent for this purpose. This 1B column therefore performs a double action; both the reduction of the transuranic element to a hexone-insoluble state and the extraction of the element into the aqueous phase are carried out simultaneously. There is some tendency for the ruthenium and cerium fission products to be carried with the transuranic element into the aqueous phase in this column.

In the next step of the process, the aqueous extractant from the 1B column containing the transuranic element is subjected to a batch oxidation step to convert the transuranic element to a higher oxidation state in which it is hexone-extractable. This step is often called the "cross-over oxidation." The oxidizing agent normally used is dichromate at elevated temperatures, for example 50–60° C. Following the cross-over oxidation step, the aqueous solution containing the transuranic element in the higher oxidation state is concentrated and further decontaminated from fission products by another hexone extraction step.

The entire process is more fully described in copending application Serial No. 318,072, Solvent Extraction Process, filed October 31, 1952, by G. T. Seaborg, Walter J. Blaedel and Matthew T. Walling, Jr., the disclosure of which is incorporated herein by reference.

There are certain difficulties with the use of dichromate as the oxidizing agent in the cross-over oxidation step. When dichromate is used, the aqueous solution must be first heated with $HNO_3$ before the introduction of dichromate, or an excessive amount of dichromate is required. This heating of the solution together with the solvent oxidizing agents tends to convert any cerium present to the $Ce^{+4}$, ceric form in which it is more readily extracted into the organic phase during the extraction step which follows. Furthermore, this strenuous oxidation tends to hydrolyze any sulfamic acid present. Other oxidizing agents, such as permanganate, have been tried but have been found to be even less desirable. For example, the permanganate is not stable in contact with hexone, so that in the operation following the cross-over oxidation the permanganate ion is rapidly reduced to $MnO_2$, the precipitated form of which interferes with the subsequent operation. Oxidizing agents much weaker than dichromate are incapable of oxidizing the transuranic elements to the hexavalent state.

It is an object of the present invention to provide a method of oxidizing a transuranic polyvalent element in the presence of fission products in a process for the recovery of said transuranic element which will permit adequate recovery of said element and maximum decontamination of said element from fission products in a subsequent solvent extraction step.

It is an additional object of the present invention to provide a method of oxidizing a transuranic element having a hexavalent state from its trivalent state to a higher valence state and ferrous ion in the presence of cerous ion.

It is a still further object of the present invention to provide a method of oxidizing a transuranic polyvalent actinide rare earth element from its trivalent to a higher valence state, in an aqueous solution in the presence of sulfamic acid, without substantially decomposing said sulfamic acid.

Other objects of the present invention will be apparent from the description of the invention which follows.

The present invention is particularly concerned with the method of oxidizing the transuranic actinide rare earth elements having a hexavalent state, specifically neptunium and plutonium, from their trivalent state to a higher state in an aqueous solution containing ferrous ions and cerous ions and in the presence of sulfamic acid, whereby the transuranic element and the ferrous ions are substantially completely oxidized to higher valence states, but the cerous ions are substantially retained in the trivalent state. The importance of this is that the transuranic elements are then extractable from the aqueous solution in a higher valence state into an organic solvent of the hexone type with a minimum of extraction of the cerium values, thus effectively decontaminating the transuranic element from cerium fission products.

In accordance with the process of the present invention, it has been discovered that an aqueous acidic solution containing trivalent values of a polyvalent actinide rare earth, ferrous ions, cerous ions, ruthenium ions and sulfamic acid can be treated with hydrogen peroxide at room temperature whereby the polyvalent actinide rare earths with trivalent values are oxidized to a higher valence state quantitatively, the ferrous ions are quantitatively oxidized to the ferric state, the cerous ions are substantially retained in the cerous state, and substantially no decomposition of sulfamic acid takes place.

The process may be applied to aqueous solutions containing either neptunium or plutonium or both, and is particularly applicable to the aqueous solutions obtained during the recovery of plutonium and neptunium from neutron-irradiated uranium by the Redox oxidation-reduction-solvent extraction process. Hydrogen peroxide will effect oxidation of the polyvalent transuranic actinide rare earth elements at room temperature. Any excess hydrogen peroxide introduced into the aqueous system is destroyed by catalytic reaction with the ferric ion produced by the reaction. The oxidation products of hydrogen peroxide do not contaminate the system. Therefore some excess over the stoichiometric amount for the oxidation of the polyvalent transuranic element and the iron present is permissible and desirable in the system. However, the concentration of free hydrogen peroxide in the aqueous system should never be substantially greater than that required to precipitate the plutonium or neptunium present.

The hydrogen peroxide will operate as an oxidizing agent over a considerable range of acid concentration in the aqueous solution. The aqueous solution is, however, usually maintained within an acid concentration range of 0.01 N to 1 N, and preferably about 0.5 N, because of other considerations. If the solution should become alkaline, there is a tendency for precipitation of the neptunium and/or plutonium values, and if the acidity of the solution is increased beyond 1 N in nitric acid, there is a tendency to oxidize the cerous values which may be present.

The improved results obtained, particularly with respect to decontamination from fission products such as cerium and ruthenium in the succeeding step of the solvent extraction process, by the present method over those which can be obtained by using dichromate ion as the oxidation agent cannot be foretold upon the basis of purely thermodynamic data. Thus, although according to the tables of oxidation potentials hydrogen peroxide is apparently a stronger oxidizing agent than dichromate, it seems to have an adequate oxidation effect upon the polyvalent transuranic elements, but to have little oxidizing effect upon the cerous ions present. This, of course, may be due to some complexing effect or other and unpredictable effect.

In addition to the advantages previously outlined for the use of hydrogen peroxide as an oxidant for trivalent plutonium values in the presence of iron, hydrogen peroxide has the additional advantage of being an economical reagent by comparison with other oxidants for plutonium, such as the metallic compounds of silver and cobalt.

Upon adding peroxide to an aqueous solution obtained by stripping trivalent plutonium values from an organic solvent used in a prior reduction-extraction cycle of the Redox process, it is noted that some color develops in the solution, presumably caused by a reaction between the hexone, ferrous ion and the hydrogen peroxide. This phenomenon can be substantially avoided by sparging the aqueous strip solution free of hexone prior to acidification and addition of peroxide thereto. Hexone removal by sparging with air or nitrogen can be effected within one-half to one hour at 40 to 50° C.

The following examples will adequately illustrate the advantages of peroxide as an oxidant for plutonium values in an aqueous strip solution resulting from a previous reduction-extraction cycle employing ferrous ions as the plutonium reducing agent and sulfamate ions as the holding reductant in the Redox process.

EXAMPLE I

A test solution simulating the composition of the aqueous solution leaving the column, wherein reduction and strip from the organic solvent is effected, was prepared. The composition was approximately as follows:

1.3 M aluminum nitrate
0.05 M Fe(II)
0.12 M sulfamic acid
0.01 M nitric acid
0.4 gram per liter Pu(III)

Spectrographic analyses of the various plutonium species in 10-mil. size test solutions containing a total product concentration between 0.3 and 0.9 gram per liter showed that essentially all the plutonium was present in the trivalent state. Upon acidifying these solutions to 0.5 M nitric acid and heating at 95° C. for four hours, approximately 80 percent of the plutonium was present in the tetravalent state and 20 percent as the trivalent plutonium. The iron present initially as ferrous ions was converted to the ferric form and the sulfamic acid was hydrolyzed.

Additional test samples of the aqueous solution were then oxidized in accordance with the process of the present invention. The solution contained essentially all the plutonium in the trivalent state as shown by spectrophotometric analysis of the aqueous solution which had the same composition as indicated previously. The samples were acidified to approximately 0.5 M nitric acid. A twofold excess (0.05 M) of hydrogen peroxide over the stoichiometric requirement for oxidation of iron present in the solution was added thereto and the solution allowed to stand at room temperature for two hours. Thereupon 91 percent of the plutonium was found to be in the tetravalent form and 9 percent in the hexavalent state. Further analysis of the resultant solution revealed that the sulfamic acid was not appreciably hydrolyzed and the excess peroxide was destroyed by ferric catalysis.

EXAMPLE II

The following experiment illustrates the catalytic decomposition of excess peroxide.

Aqueous solutions of trivalent plutonium values having the same composition as the solution employed in Example I and obtained from the solvent extraction-reduction cycle were oxidized within approximately one-half hour periods to mixtures containing approximately 60 to 40 percent, respectively, of tetravalent and hexavalent plutonium by the addition of 0.05 M hydrogen peroxide and digestion at room temperature. Oxidations of three samples containing, respectively, 0.25, 0.3, and 0.5 gram per liter of plutonium were effected both in the presence and in the absence of stainless steel.

In the previous experiments the addition of peroxide to the solutions of trivalent plutonium was accompanied by immediate development of the intense red of tetravalent plutonium peroxy complex and evolution of bubbles. However, the red color faded to the straw color of the tetravalent-hexavalent plutonium mixture in 15 to 20 minutes and no peroxide was detectable in the solutions upon spot testing with dilute dichromate. Upon repeating the test with a plutonium-free solution of similar composition, the presence of peroxide at the end of two hours was indicated by a moderately strong response to the dichromate spot test. The results of the foregoing tests for excess peroxide indicate that catalytic decomposition of the excess peroxide is the result of the synergistic action of both iron and plutonium rather than the iron alone.

EXAMPLE III

In addition to furthering oxidation of plutonium in order to separate it by solvent extraction from fission product values, the use of hydrogen peroxide as an oxidant also serves to increase the extent to which fission products can be separated from plutonium, as shown by the following experiments.

In order to determine the effect of the hydrogen peroxide oxidant upon separation of plutonium from fission products in the second oxidation-extraction cycle, a series of 1-ml. portions of the 0.5 N $HNO_3$ aqueous plutonium-containing solution from a prior ferrous sulfamate-hexone reduction-extraction cycle were enriched in ruthenium by addition of tracer solutions of ruthenium and cerium. The solutions were then oxidized with excess hydrogen peroxide over the stoichiometric amount required to oxidize the ferrous and plutonous values present and allowed to stand for two hours at room temperature. The oxidized solutions were then contacted with an equal volume of sparged hexone in order to extract the oxidized plutonium values therefrom. The following data indicate the distribution coefficients for ruthenium and cerium in the hexone solvent. In the case of the ruthenium contactings the hexone phase was scrubbed with successive portions of 1.3 M aqueous $Al(NO_3)_3$ solution and both phases sampled after each scrub.

*Table I*

DISTRIBUTION COEFFICIENTS OF RUTHENIUM AND CERIUM

| Oxidizing Conditions | Tracer | E $\frac{\text{Hexone}}{\text{Aqueous}}$ | Scrubs, ml. |
|---|---|---|---|
| 0.02 M $Na_2Cr_2O_7$ | Ru | 0.04 | 2.1, 2.6, 3.0 |
| 0.05 M $H_2O_2$ | Ru | [1] 0.034 | 3.0 |
| 0.02 M $Na_2Cr_2O_7$ | [2] Ce | 0.32 | |
| 0.05 M $H_2O_2$ | [2] Ce | 0.0014 | |

[1] Ru tracer had stood in solution obtained by the reduction-extraction cycle for several days prior to hexone second cycle extraction in the oxidation-extraction cycle.
[2] Carrier-free; about $10^6$ dis./min./ml.

From the foregoing data it is readily apparent that separation of cerium from plutonium is substantially improved by employing hydrogen peroxide as the oxidant for plutonium values. However, the improvement in separation of ruthenium from plutonium is not quite so marked.

EXAMPLE IV

A further advantage of employing hydrogen peroxide as the oxidant for plutonium values in oxidation-reduction systems for separation of plutonium from fission products is that hydrogen peroxide does not hydrolyze sulfamic acid to any appreciable extent, as shown by the following data obtained by reactions between hydrogen peroxide and sulfamic acid at room temperature in dilute acidic aqueous solution. The solutions were analyzed for sulfamic acid by the hydrogen sulfide method.

*Table II*

| Solution | Initial $H_2O_2$ Conc., moles/liter | Elapsed Time, days | $H_2NSO_3H$ Found, grams/liter |
|---|---|---|---|
| A [1] | 0 | 5 | 8.9 |
| A | 0.1 | 5 | 9.5 |
| A | 0.25 | 7 | 7.7 |
| B [2] | 0 | 5 | 11.4 |
| B | 0.1 | 5 | 11.0 |

[1] Solution A: 0.1 M $H_2NSO_3H$ (9.7 grams/liter), 0.5 M $HNO_3$.
[2] Solution B: 1.3 M $Al(NO_3)_3$, 0.05 M Fe (II), 0.12 M $H_2NSO_3H$ (11.6 grams/liter), 0.5 M $HNO_3$.

From these results it would appear that no appreciable reaction occurred, or at least that the magnitude of the reaction was less than the probable uncertainty in the analyses.

EXAMPLE V

The utility of hydrogen peroxide as an oxidant for trivalent plutonium metal in the presence of iron and combination of this oxidation process with solvent extraction is best illustrated by the following example.

The aqueous solution from a reduction-extraction cycle was acidified to 0.5 M nitric acid and oxidized with an excess of hydrogen peroxide (0.05 M). The resultant oxidized solution contained 96 percent hexavalent plutonium and 4 percent tetravalent plutonium. Upon making four successive extractions of this peroxide-oxidized solution with equal volumes of pre-equilibrated hexone, it was found that less than 0.03 percent of the plutonium initially present in the oxidized solution remained.

It will be understood that the scope of the instant invention is not to be limited by the details included in the descriptions in the foregoing examples. The scope of the present invention is to be limited only by the limitations set forth and the claims appended hereto which are intended to cover as broadly as possible in view of the prior art all features of novelty herein disclosed, taken either singly or in combination.

What is claimed is:

1. In a process for the recovery of a transuranic element having a hexavalent state from uranium and fission products, said fission products comprising values selected from the group consisting of Ce (III), Ru values and mixture of Ce (III) and Ru values, the step which comprises treating an aqueous 0.01–1 N nitric acid solution containing trivalent values of said transuranic element, ferrous ion, sulfamic acid, and a fission product with a quantity of hydrogen peroxide stoichiometrically sufficient to oxidize the ferrous ion to the ferric state and the trivalent transuranic element to the hexavalent state, and digesting said solution at room temperature.

2. The process of claim 1 wherein the fission product is cerous ion.

3. The process of claim 1 wherein the fission product is ruthenium.

4. A method of oxidizing a transuranic element having a trivalent state to a hexavalent state in the presence of cerous values without oxidizing the cerous values which comprises treating an aqueous 0.01–1 N nitric acid solution containing cerous values and trivalent values of said transuranic element with a quantity of hydrogen peroxide stoichiometrically sufficient to oxidize the trivalent transuranic element to the hexavalent state, and digesting said solution at room temperature.

5. A method of oxidizing a transuranic element having a trivalent state to a hexavalent state in the presence of cerous values and sulfamic acid without oxidizing the cerous values or decomposing the sulfamic acid which comprises treating an aqueous 0.01–1 N nitric acid solution containing cerous values, sulfamic acid, and trivalent values of said transuranic element with a quantity of hydrogen peroxide stoichiometrically sufficient to oxidize the trivalent transuranic element to the hexavalent state, and digesting said solution at room temperature.

References Cited in the file of this patent

Mellor: Comprehensive Treatise of Inorg. and Theoretical Chemistry, vol. 5, p. 609 (1924), Longmans, London.

Flagg et al.; Scientific American, vol. 187, No. 1, July 1952, pp. 62–67.

Harvey: Nucleonics, vol. 2, No. 4, April 1948, pp. 30–40.

Seaborg et al.: "The Actinide Elements," pp. 283–285, 299–300 (1954). Publ. by McGraw-Hill Book Co., N. Y. Notes 162 and 172 give dates in 1945 for prior knowledge under Sec. 155.